Aug. 3, 1954

E. R. PRICE 2,685,172

POWER-ASSISTED MASTER CYLINDER

Original Filed Aug. 17, 1949

INVENTOR.
EARL R. PRICE
BY
T. J. Plante
ATTORNEY

Aug. 3, 1954

E. R. PRICE 2,685,172

POWER-ASSISTED MASTER CYLINDER

Original Filed Aug. 17, 1949

INVENTOR.
EARL R. PRICE
BY
T. J. Plante
ATTORNEY

Patented Aug. 3, 1954

2,685,172

UNITED STATES PATENT OFFICE 2,685,172

POWER-ASSISTED MASTER CYLINDER

Earl R. Price, South Bend, Ind., assignor to Bendix Aviation Corporation, South Bend, Ind., a corporation of Delaware Continuation of application Serial No. 110,816, Aug. 17, 1949. This application July 7, 1953, Serial No. 366,540

19 Claims. (Cl. 60—54.6)

This application is a continuation of copending application Serial No. 110,816, filed August 17, 1949, now abandoned.

This invention relates to a power-assisted master cylinder, i. e. a liquid pressure producing device in which physical operating force is supplemented by power assistance. The device is intended primarily as an actuator for a vehicle brake system, although other uses are possible.

More specifically, the invention relates to a pressure producing device comprising a master cylinder, a power cylinder, and two co-axial plunger, or piston, members adapted to concurrently displace liquid from the master cylinder, one of said members being moved by the power cylinder piston, and the other of said members being moved by the force exerted by the operator. Sorensen Patent No. 2,006,487 discloses a pressure producing device of the type described in the preceding sentence.

The primary object of the present invention is to provide a device of this type which is appreciably improved, from the standpoint of commercial acceptability, over any similar devices heretofore proposed, owing to the following advantages:

(a) Improved operation because of a smoother and better "feeling" pressure stroke;

(b) Improved operation because of more positive sealing of the liquid in the hydraulic system and more efficient liquid compensation during the return stroke;

(c) A shorter unit for any given output requirement, reducing the space needed for installation;

(d) A unit better adapted for actuation by a treadle, when the latter is substituted for the conventional pedal; and (e) A unit which is relatively inexpensive to manufacture, particularly when its operating advantages are taken into account.

A specific feature of the present invention is the provision of a power-assisted master cylinder unit having a liquid-displacing member in the hydraulic cylinder which is of smaller effective diameter than the cylinder bore and which carries a projection adapted to control the seating and unseating of a valve associated with a port between the cylinder bore and a hydraulic reservoir. With this arrangement, certain advantages are realized: (a) the complete unit is shorter and therefore easier to locate than it would be with a conventional master cylinder piston and sealing cup; and (b) the larger diameter of the cylinder bore, for a given displacement rating and length of stroke, avoids the problems which result from trying to utilize a seal and a check valve in too small a bore.

Other objects and advantages of the present invention will become apparent during the following description of an illustrative embodiment of the invention, reference being had therein to the accompanying drawings, in which:

Referring to the drawings, my improved liquid pressure producing device comprises a power cylinder 12 and a hydraulic cylinder 14 mounted on one end of the power cylinder. The end of the hydraulic cylinder remote from the power cylinder has a discharge port 16 which is connected by one or more conduits 18 to one or more hydraulically actuated motors 20, which may be used to operate wheel brakes 22.

Inside hydraulic cylinder 14 is a pressure chamber 24, wherein the operating pressure for motors 20 is developed jointly by the force exerted by power cylinder piston 26 and the force exerted by the operator on treadle 28. The lower end of the treadle is pivotally supported at 30, and the upper end of the treadle is pivotally connected, by means of pin 32, to a clevis 34 formed on one end of a thrust rod 36.

Power cylinder 12 is preferably a differential air pressure power cylinder, utilizing either vacuum or compressed air to provide the necessary pressure differential. In ordinary automobile installations, a vacuum power cylinder is preferable to a compressed air power cylinder, because the conventional intake manifold, such as the one shown diagrammatically at 38 in Figure 1, may be used as the vacuum source.

The vacuum power cylinder in the illustrated embodiment of the invention is atmosphere-suspended, i. e. air at atmospheric pressure is on both sides of piston 26 when the mechanism is in released position. Although a vacuum-suspended power cylinder may be used if desired, there are certain advantages accruing from the use of an atmosphere-suspended power cylinder. For one thing, chamber 39 of the power cylinder does not have to be sealed, since it is kept under atmospheric pressure. This means that the angular movement of control rod 36 during the pressure stroke does not create any structural problem in the design of the power cylinder. Furthermore, operation of an atmosphere-suspended power cylinder is inherently smoother and less sensitive than the operation of a vacuum-suspended power cylinder. On the other hand, speed of operation, which is the primary advantage of the vacuum-suspended power cylinder, is not considered as vital in installations where my improved pressure-producing device is likely to be used, as it would be in heavier duty installations.

A closure member 40 is located between pressure chamber 24 and the interior of power cylinder 12. The closure member may be constituted by a tubular plug screwed into the end of the hydraulic cylinder, as shown. Power cylinder piston 26, which is referred to in the claims as a pressure-responsive movable wall, forms one side of control chamber 42 in the power cylinder, and has a central opening 44 which permits the operator-controlled force-transmitting member to extend into hydraulic pressure chamber 24. A hollow pressure-transmitting member 46 has a tubular portion 48 which is secured at one end to power piston 26 in alignment with the opening in the piston, and which extends at the other end through the closure member 40 into hydraulic pressure chamber 24. In the illustrated version of the device, the plates which constitute piston 26 are clamped between a sleeve 50 carried by tubular member 48 and a washer 52 which is held in position by a C-shaped spring locking member 54. Sleeve 50 is retained in position by a flange 56 on tubular member 48. A port 58 provided in sleeve 50 is connected by means of a metal tube 59, and a coiled, flexible vacuum hose 60 to a metal tube 62 which extends through an opening in the power cylinder casing, and which is connected to manifold 38. As shown, sleeve 50 may be used as a spacer which determines the released position of piston 26 by engagement with a closure plate 64 secured to the end of the power cylinder casing. A spring 66, seated against end wall 68 of the power cylinder, returns power cylinder piston 26 to retracted position.

An annular sealing member 70, substantially U-shaped in cross-section, is seated against the inner end of closure member 40. The inner lip 72 of sealing member 70 engages the cylindrical outer surface of tubular member 48, and the outer lip 74 of sealing member 70 engages the wall of hydraulic pressure chamber 24, for the purpose of preventing escape of liquid from said chamber.

Reciprocably mounted inside tubular member 48 is a plunger member 82 which has one end in engagement with a sliding valve control member 84, and the other end 86 extending into hydraulic pressure chamber 24, for the purpose of assisting power operated member 46 in displacing liquid under pressure from the hydraulic cylinder, and also for the purpose of giving the operator a direct indication of, and control over, the brake operating pressure developed in chamber 24. Although plunger member 82 and valve member 84 are preferably formed separately, as shown, for convenience in manufacturing the device, they may be considered to constitute jointly a plunger member, or force-transmitting member, which provides a thrust connection between rod 36 and the liquid in chamber 24.

As shown, valve member 84 is a cylindrical, sliding valve, the exterior of which has two reduced diameter portions providing chambers 88 and 90, which are separated by an annular land 92. Chamber 88 communicates through ports 94 in tubular member 48 and port 58 in sleeve 50 with the vacuum source. Chamber 90 communicates through ports 96, passage 98 in valve member 84, and ports 100, formed in an end fitting 101, with the atmosphere. Chamber 39 may be connected through conduit 102 to an air cleaner 104. One or more ports 106 in tubular member 48 provide communication between the interior of the tubular member and power cylinder chamber 42. In the released, or retracted position of the device, ports 106 open into atmosphere chamber 90, thus permitting air at atmospheric pressure to enter chamber 42. The end of valve member 84 remote from plunger member 82 is provided with a spherical socket 108 which receives the ball-shaped end 110 of rod 36. The ball and socket connection permits swiveling movement of the rod relative to the valve member during the pressure stroke.

Figures 1, 4:
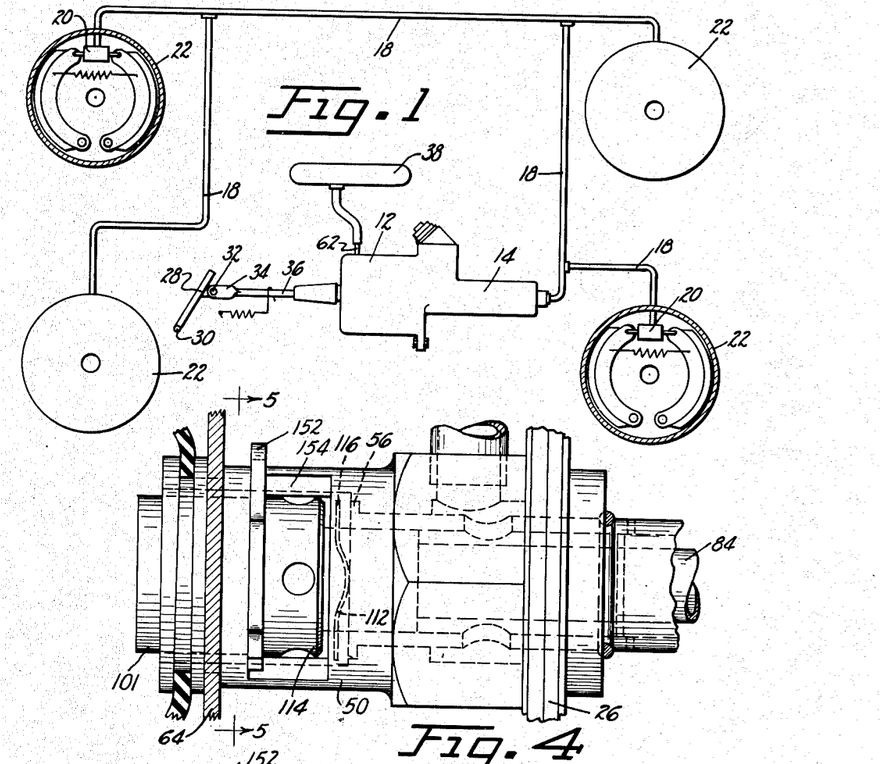
Figure 1 is a diagrammatic showing of a brake operating system which incorporates my improved pressure producing device.
Figure 4 is an enlarged side view of part of the mechanism shown in Figure 2.
Figures 2, 3:
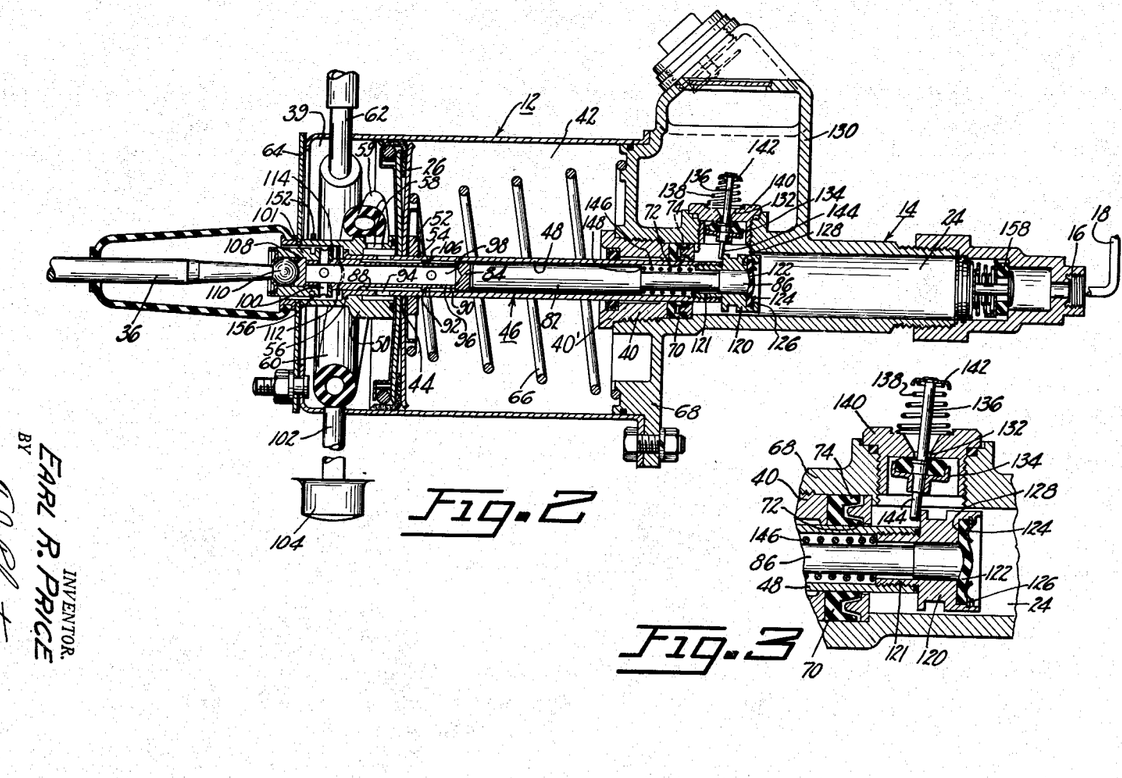
Figure 2 is a longitudinal section taken through the pressure producing device of Figure 1.
Figure 3 is a closeup of part of the section shown in Figure 2.
Figure 5:
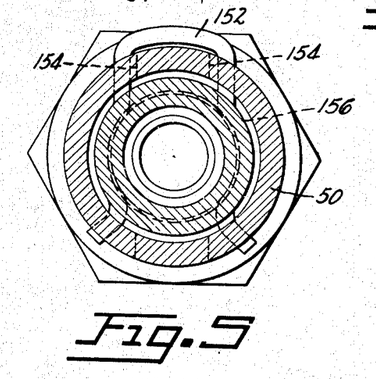
Figure 5 is a section on the line 5—5 of Figure 4.

Use of the sliding control valve 84, instead of valve elements which move to and away from seated position, results in smoother operation of the device. Another element which contributes to improved control of the brake actuating device is the movement-opposing member, or "wave washer" 112, an enlarged view of which is shown in Figure 4. Wave washer 112 is mounted between flange 56 of tubular member 48 and flange 114 on the adjacent end of fitting 101. The design of washer 112 is such that flange 114 engages surfaces 116 after land 92 has moved beyond port 106 a predetermined distance. When flange 114 engages surface 116 of the wave washer, resistance to further opening of the valve is increased, with the result that the tendency to "over-shoot" and cause "hunting" of the valve is largely overcome. If a wider valve opening is desired, it can be obtained by exerting sufficient force on wave washer 112 to compress the washer axially.

The end of tubular member 48 inside the hydraulic cylinder carries an enlarged head portion 120, which may be formed as an integral part of the tubular member, or which may, as shown, be an annular member having a sleeve 121 in threaded engagement with the end of the tubular member. The radially inner surface of head portion 120 engages the outer surface of the end portion 86 of plunger member 82. A flexible diaphragm 122 is peripherally secured to the outer portion of head 120, and covers the end of plunger member 82 to act as a seal between the hydraulic pressure chamber and the interior of tubular member 48. One of the chief reasons for providing the enlarged head 120 on the end of tubular member 48 is to allow use of a diaphragm which has a sufficiently large diameter to permit its periphery to be satisfactorily secured in place. In order to hold the outer edge of diaphragm 122 in position, an annular retaining member 124 is held against one side of the diaphragm by a peened-over bead 126 formed in head 120. The other side of diaphragm 122 lies against surface 128 of head 120.

A hydraulic reservoir 130 is mounted above the hydraulic cylinder, and has a compensating port 132 which opens into hydraulic pressure chamber 24. A valve element 134 is arranged when seated to prevent flow of liquid from the hydraulic pressure chamber to the reservoir, but to permit flow in the opposite direction if a vacuum is developed in chamber 24 during the return stroke. Valve element 134 is carried by a valve stem 136, one end of which extends through compensating port 132. A spring 138, supported on plug 140, in which the compensating port is formed, acts against a collar 142 carried by valve stem 136 to urge the valve element toward seated position. The lower end 144 of valve stem 136 extends into the path of head 120 of tubular member 48. During the final portion of the retractile stroke of tubular member 48, head portion 120 engages valve stem 144 to move the latter angularly and thereby lift one side of valve element 134 to establish free communication between the hydraulic pressure chamber and the interior of reservoir 130.

Plunger member 82 and valve control member 84 are urged toward released position by a compression spring 146, one end of which engages a flange 148 on plunger member 82, and the other end of which engages the end of threaded sleeve 121. The particular position of spring 146 is not important, provided it exerts a force tending to move valve member 84 toward the left with respect to tubular member 48, the leftward portion of which cooperates with valve member 84 in controlling operation of power cylinder piston 26. The released position of valve member 84 is determined by a substantially U-shaped positioning member 152, the arms of which extend through segmental slots 154 provided in sleeve 50, into annular slot 156 in valve member 84. Slots 154 have a sufficiently wide axial dimension to allow the movement required to actuate the control valve.

The way in which my improved pressure-producing device operates is believed to be obvious from the foregoing description. However, the following summary is given for the sake of clarity. When the operator depresses treadle 28, rod 36 moves valve member 84, against the resistance of spring 146, to first bring land 92 into alignment with port 106, thereby cutting off communication between power chamber 42 and the atmosphere. Additional movement of valve member 84 toward the right carries land 92 past port 106, establishing communication between chamber 42 and the vacuum source. Evacuation of air from chamber 42 causes a pressure differential to act on power cylinder piston 26, moving it toward the right, against the resistance of return spring 66.

As power cylinder piston 26 moves toward the right, it drives pressure-transmitting member 46 on its pressure stroke, displacing liquid from hydraulic pressure chamber 24. The initial movement of head portion 120 of pressure-transmitting member 46 disengages the lower end 144 of valve stem 136. Spring 138 is thus permitted to seat valve element 134, thereby preventing flow of liquid under pressure from chamber 24 to the reservoir.

The amount of liquid which is displaced from chamber 24 to actuate the motors 20 during a given length of pressure stroke depends upon the outer diameter of tubular member 48. In normal operation of the device, the work done by the power cylinder piston is responsible for displacing an amount of liquid proportional to the annular area between the outer surface of tubular member 48 and the inner surface of head portion 120 which engages plunger member 82; the work done by the operator is responsible for displacing an amount of liquid proportional to the area of the end portion 86 of plunger member 82. Except for the lost motion required to operate the valve, tubular member 48 and plunger member 82 move as a unit during the pressure stroke.

The amount of pressure developed in the brake system is indicated to the operator by the direct reaction of the liquid in chamber 24 against the end of plunger member 82. Therefore, in order to increase the brake applying pressure, the operator must increase the force which he exerts on the treadle. Furthermore, in order to continue the brake-applying stroke of power cylinder piston 26, the operator must continue to move valve member 84 toward the right. When valve member 84 ceases to move toward the right, the follow-up movement of power piston 26 and tubular member 48 brings ports 106 into alignment with land 92, thus placing the valve in "lapped" position, which position will be retained until valve member 84 is moved either toward the left to release the brakes, or toward the right to further apply the brakes.

During the applying stroke, after valve member 84 has moved a predetermined distance toward the right and has opened ports 106 to chamber 88 to a predetermined extent, the enlarged left end of valve member 84 engages wave washer 112, tending to prevent an excessive valve opening movement. If the operator desires to obtain a maximum valve opening movement he can compress wave washer 112 with additional applying force. However, the presence of the wave washer tends to avoid the "fluttering," or "hunting" action of the valve which can occur when the valve opening movement is unrestricted. If the power cylinder should fail to be effective, the force exerted by the operator will flatten the wave washer between the end of valve member 84 and the flange 56 of tubular member 48, permitting the operator to drive the entire assembly with physical force, attaining full displacement of liquid in the hydraulic system.

When pressure on treadle 28 is removed, spring 146 moves valve member 84 back to the position in which chamber 42 is in communication with the atmosphere. As air enters chamber 42, the pressure differential over power piston 26 is reduced, and eventually destroyed, permitting spring 66 to return the power piston to released position. The entire liquid-displacing unit is thus withdrawn to the left in hydraulic pressure chamber 24, releasing the brake-applying pressure.

During the return stroke, a predetermined pressure is maintained in the hydraulic lines by means of the conventional residual pressure check valve 158. For a description of check valve 158, reference may be had to Bowen Patent No. 1,841,354. If the pressure in chamber 24 falls below atmospheric pressure during the return stroke, valve element 134 will be unseated by the pressure of liquid in the reservoir, which will then flow into chamber 24 to keep the chamber filled. When the head 120 of pressure-transmitting member 46 reaches the end of its retractile stroke it engages valve stem 136 to lift one side of valve element 134, thereby re-establishing free communication between the reservoir and chamber 24.

My improved pressure-producing device is designed primarily for use in brake-actuating installations which are operated by a treadle, rather than the conventional brake pedal. Use of a treadle as the brake control member simplifies control of the brakes by reducing the distance through which the operator's foot has to move to engage the brake control member. This is a significant safety feature, because the time required to bring the operator's foot into engagement with the brake control member is one of the important time delays in obtaining brake application. Furthermore, in automobiles which no longer have a clutch pedal in the driver's compartment, it is particularly desirable to use a brake-operating treadle which is similar to the accelerator treadle. The appearance of the operator's compartment is improved and the foot room is increased.

Utilization of a brake control treadle places the following limitations on design of the master cylinder. In the first place, the master cylinder stroke has to be longer than in the case of the conventional brake pedal, because the treadle acts directly on the master cylinder, without the conventional lever arm movement ratio. Furthermore, because the operator does not have a mechanical advantage in operating the master cylinder, the initial frictional forces must be reduced to a minimum, if satisfactory treadle "feel" is to be obtained.

Sealing diaphragm 122 is preferred to the conventional sliding seal both because it reduces the frictional opposition to movements of plunger member 82 and valve member 84, and because it provides a positive seal which insures against admission of liquid to the interior of tubular member 48. Use of diaphragm 122 necessitates the provision of an enlarged head 120 on the end of pressure-transmitting member 46. It is difficult, if not impossible, to satisfactorily secure a diaphragm sealing member in position if its diameter is extremely small. On the other hand, it is not feasible to enlarge the working diameter of tubular member 48 because such a change would necessitate making the operating stroke of the master cylinder too short for satisfactory control.

Because of the use of the enlarged head 120 on pressure-transmitting member 46, a fixed annular seal, such as the seal 70, is required at the end of the hydraulic cylinder adjacent the power cylinder. Use of the fixed, i. e. stationary, seal 70 has the additional advantage of permitting the hydraulic cylinder to be shorter than it would be if a conventional piston having spaced lands were used.

The enlarged head 120 on pressure-transmitting member 46 provides a convenient flange for engaging the stem of valve member 134 to tilt the valve in the released position of the device. Use of the "seating" valve 134, rather than the conventional uncovered port, together with use of the stationary annular seal 70, avoids the need for machining the bore of the hydraulic cylinder. Use of the "seating" valve 134 also simplifies construction of the head portion 120 of pressure-transmitting member 46, inasmuch as the head does not need to carry a seal engaging the wall of chamber 24.

Although a particular embodiment of my invention has been described, it will be understood by those skilled in the art that the object of the invention may be attained by the use of constructions different in certain respects from that disclosed without departing from the underlying principles of the invention.

I claim:

1. A liquid pressure-producing device, in which physical force is supplemented by power assistance, comprising a differential air pressure power cylinder, a hydraulic cylinder mounted on one end of the power cylinder and having a pressure chamber provided with a discharge port, a pressure-responsive movable wall in the power cylinder having a central opening, a tubular pressure-transmitting member secured at one end to the movable wall in alignment with said opening and extending at the other end into the hydraulic pressure chamber, said tubular member having a port which is adapted, to provide communication between the interior of the tubular member and the power cylinder chamber formed between the movable wall and the end of the power cylinder adjacent the hydraulic cylinder, a cylindrical valve member slidably mounted inside the tubular member, the exterior of the valve member having two reduced-diameter portions providing chambers which are separated by an annular land and which are in communication, respectively, with the atmosphere and with a vacuum source, the atmosphere-connected valve chamber being in communication with the port in the tubular member in released position, an operator operated rod connected to the end of the valve member, the power cylinder chamber through which the rod and valve member extend being open to the atmosphere, a plunger member movable inside the tubular member and having one end in engagement with the valve member and the other end extending into the hydraulic pressure chamber, an annular head on the end of the tubular member inside the hydraulic pressure chamber, said head having an outer portion of greater diameter than the tubular member, a flexible diaphragm peripherally secured to the outer portion of the head and covering the end of the plunger member to act as a seal between the hydraulic pressure chamber and the interior of the tubular member, a spring which urges the valve member toward released position, a hydraulic reservoir mounted above the hydraulic cylinder and having a port which opens into the hydraulic pressure chamber, a valve element arranged when seated to prevent flow of liquid from the hydraulic pressure chamber to the reservoir, a spring tending to seat the valve element, and a valve stem associated with the valve element and extending into the path of the head on the tubular member, said stem being moved angularly by engagement with the head during the final portion of its retractile stroke to unseat the valve element and thereby permit communication between the hydraulic pressure chamber and the reservoir.

2. A liquid pressure producing device, in which physical force is supplemented by power assistance, comprising a differential air pressure power cylinder, a hydraulic cylinder mounted on one end of the power cylinder and having a pressure chamber provided with a discharge port, a pressure-responsive movable wall in the power cylinder having a central opening, a tubular pressure-transmitting member secured at one end to the movable wall in alignment with said opening and extending at the other end into the hydraulic pressure chamber, said tubular member having a port adapted to provide communication between the interior of the tubular member and the power cylinder chamber formed between the movable wall and the end of the power cylinder adjacent the hydraulic cylinder, a cylindrical valve member slidably mounted inside the tubular member, the exterior of the valve member having reduced-diameter portions providing two chambers which are in communication, respectively, with the atmosphere and with a vacuum source, the atmosphere-connected valve chamber being in communication with the port in the tubular member in released position, an operator operated rod connected to the end of the valve member, the power cylinder chamber through which the rod and valve member extend being open to the atmosphere, a plunger member located inside the tubular member and arranged to move with the valve member, one end of the plunger member extending into the hydraulic pressure chamber, an annular head on the end of the tubular member inside the hydraulic pressure chamber, said head having an outer portion of greater diameter than the tubular member, a flexible diaphragm peripherally secured to the outer portion of the head and covering the end of the plunger member to act as a seal between the hydraulic pressure chamber and the interior of the tubular member, a spring which urges the valve member toward released position, a hydraulic reservoir mounted above the hydraulic cylinder and having a port which opens into the hydraulic pressure chamber, a valve element arranged when seated to prevent flow of liquid from the hydraulic pressure chamber to the reservoir, a spring which tends to seat the valve element, and a valve stem associated with the valve element, said stem being moved angularly by the head on the tubular member during the final portion of its retractile stroke to establish communication between the hydraulic pressure chamber and the reservoir.

3. A liquid pressure-producing device, in which physical force is supplemented by power assistance, comprising a differential air pressure power cylinder, a hydraulic cylinder mounted on one end of the power cylinder and having a pressure chamber provided with a discharge port, a pressure-responsive movable wall in the power cylinder having a central opening, a tubular pressure-transmitting member secured at one end to the movable wall in alignment with said opening and extending at the other end into the hydraulic pressure chamber, said tubular member having a port which is adapted to provide communication between the interior of the tubular member and the power cylinder chamber formed between the movable wall and the end of the power cylinder adjacent the hydraulic cylinder, a valve control member movable inside the tubular member and arranged to selectively connect the port in the tubular member to the atmosphere or to a vacuum source, an operator operated rod connected to one end of the valve control member, the power cylinder chamber through which the rod and valve control member extend being open to the atmosphere, a plunger member located inside the tubular member and arranged to move with the valve control member, one end of the plunger member extending into the hydraulic pressure chamber, the tubular member and the plunger member having a combined effective liquid-displacing area in the pressure chamber smaller than the cross-sectional area of said pressure chamber, an annular head on the end of the tubular member inside the hydraulic pressure chamber, said head having an outer portion of greater diameter than the tubular member, a flexible diaphragm peripherally secured to the outer portion of the head and covering the end of the plunger member to act as a seal between the hydraulic pressure chamber and the interior of the tubular member, a hydraulic reservoir mounted above the hydraulic cylinder and having a port which opens into the hydraulic pressure chamber, a valve element arranged when seated to prevent flow of liquid from the hydraulic pressure chamber to the reservoir, a spring which tends to seat the valve element, and a valve stem associated with the valve element, said stem being moved angularly by the head on the tubular member during the final portion of its retractile stroke to establish communication between the hydraulic pressure chamber and the reservoir.

4. A liquid pressure producing device, in which physical force is supplemented by power assistance, comprising a differential air pressure power cylinder, a hydraulic cylinder mounted on one end of the power cylinder and having a pressure chamber provided with a discharge port, a pressure-responsive movable wall in the power cylinder having a central opening, said movable wall dividing the power cylinder into a constant pressure chamber and a control chamber, a tubular pressure-transmitting member secured at one end to the movable wall in alignment with said opening and extending at the other end into the hydraulic pressure chamber, said tubular member having a port adapted to provide communication between the interior of the tubular member and the control chamber of the power cylinder, a valve control member movable inside the tubular member and arranged to selectively connect the port in the tubular member to the atmosphere or to a vacuum source, an operator operated rod connected to the one end of the valve control member, a plunger member located inside the tubular member and arranged to move with the valve control member, one end of the plunger member extending into the hydraulic pressure chamber, the tubular member and the plunger member having a combined effective liquid-displacing area in the pressure chamber smaller than the cross-sectional area of said pressure chamber, an annular head on the end of the tubular member inside the hydraulic pressure chamber, a flexible diaphragm peripherally secured to the head and covering the end of the plunger member to act as a seal between the hydraulic pressure chamber and the interior of the tubular member, a hydraulic reservoir mounted above the hydraulic cylinder and having a port which opens into the hydraulic pressure chamber, a valve element arranged when seated to prevent flow of liquid from the hydraulic pressure chamber to the reservoir, a spring tending to seat the valve element, and a valve stem associated with the valve element, said stem being moved angularly by the head on the tubular member during the final portion of its retractile stroke to establish communication between the hydraulic pressure chamber and the reservoir.

5. A liquid pressure producing device, in which physical force is supplemented by power assistance, comprising a power cylinder, a hydraulic cylinder mounted on one end of the power cylinder and having a pressure chamber, a pressure-responsive movable wall in the power cylinder, a tubular pressure-transmitting member connected to the movable wall and provided with an enlarged head member located in the hydraulic pressure chamber, an operator operated plunger member reciprocably mounted in the pressure-transmitting member for controlling operation of the power cylinder by means of its movements with respect to the pressure-transmitting member, one end of the plunger member being subjected to the pressure in the hydraulic pressure chamber, the pressure-transmitting member and the plunger member having a combined effective liquid-displacing area in the pressure chamber smaller than the cross-sectional area of said pressure chamber, a flexible diaphragm peripherally secured to the enlarged head member and covering the end of the plunger member to act as a seal between the hydraulic pressure chamber and the interior of the pressure-transmitting member, a hydraulic reservoir mounted above the hydraulic cylinder and having a port which opens into the hydraulic pressure chamber, a valve element arranged when seated to prevent flow of liquid from the hydraulic pressure chamber to the reservoir, a spring tending to seat the valve element, and a valve stem associated with the valve element, said stem being moved angularly by the head member during the final portion of its retractile stroke to establish communication between the hydraulic pressure chamber and the reservoir.

6. A liquid pressure-producing device, in which physical force is supplemented by power assistance, comprising a power cylinder, a hydraulic cylinder located at one end of the power cylinder and having a pressure chamber, a pressure-responsive movable wall in the power cylinder, a hollow pressure-transmitting member connected to the movable wall and extending into the hydraulic pressure chamber, a sealing member engaging the outer surface of said pressure-transmitting member to prevent escape of liquid from the hydraulic pressure chamber, an operator operated plunger member which is reciprocably mounted in the pressure-transmitting member and which controls operation of the power cylinder by means of its movements with respect to the pressure-transmitting member, one end of the plunger member being subjected to the pressure in the hydraulic pressure chamber, the pressure-transmitting member and the plunger member having a combined effective liquid-displacing area in the pressure chamber smaller than the cross-sectional area of said pressure chamber, a flexible diaphragm secured to the pressure-transmitting member and covering the end of the plunger member to act as a seal between the hydraulic pressure chamber and the interior of the pressure-transmitting member, a hydraulic reservoir having a port which opens into the hydraulic pressure chamber, and a valve element which is arranged when seated to prevent flow of liquid from the hydraulic pressure chamber to the reservoir and which is held open by the pressure-transmitting member when the latter is in retracted position.

7. A liquid pressure-producing device, in which physical force is supplemented by power assistance, comprising a power cylinder, a hydraulic cylinder located at one end of the power cylinder and having a pressure chamber, a pressure-responsive movable wall in the power cylinder, a hollow pressure-transmitting member connected to the movable wall and extending into the hydraulic pressure chamber, an operator operated plunger member which is reciprocably mounted in the pressure-transmitting member and which controls operation of the power cylinder by means of its movements with respect to the pressure-transmitting member, one end of the plunger member being subjected to the pressure in the hydraulic pressure chamber, the pressure-transmitting member and the plunger member having a combined effective liquid-displacing area in the pressure chamber smaller than the cross-sectional area of said pressure chamber, a flexible diaphragm which is secured to the pressure-transmitting member and which acts as a seal between the hydraulic pressure chamber and the interior of the pressure-transmitting member, a hydraulic reservoir having a port which opens into the hydraulic pressure chamber, and a valve element which is arranged when seated to prevent flow of liquid from the hydraulic pressure chamber to the reservoir and which is held open by the pressure-transmitting member when the latter is in retracted position.

8. A liquid pressure-producing device, in which physical force is supplemented by power assistance, comprising a power cylinder, a hydraulic cylinder located at one end of the power cylinder and having a pressure chamber, a closure member between said pressure chamber and the interior of the power cylinder and provided with an opening therethrough, a pressure-responsive movable wall in the power cylinder, a hollow pressure-transmitting member connected to the movable wall and extending through the opening in the closure member into the hydraulic pressure chamber, an annular sealing member seated against said closure member and engaging the outer surface of said pressure-transmitting member to prevent escape of liquid from the hydraulic pressure chamber, an operator operated plunger member which is reciprocably mounted in the pressure-transmitting member and which controls operation of the power cylinder by means of its movements with respect to the pressure-transmitting member, the end of the plunger member adjacent the hydraulic pressure chamber being subjected to the pressure in said chamber, the pressure-transmitting member and the plunger member having a combined effective liquid-displacing area in the pressure chamber equal to the area of the opening in the closure member, and a flexible diaphragm which is secured to the pressure-transmitting member and which acts as a seal between the hydraulic pressure chamber and the interior of the pressure-transmitting member.

9. A liquid pressure-producing device, in which physical force is supplemented by power assistance, comprising a power cylinder, a hydraulic cylinder located at one end of the power cylinder and having a pressure chamber, a closure member between said pressure chamber and the interior of the power cylinder and having an opening therethrough, a pressure-responsive movable wall in the power-cylinder, a hollow pressure-transmitting member connected to the movable wall and extending through the opening in the closure member into the hydraulic pressure chamber, an annular sealing member coacting with said closure member to prevent escape of liquid from the hydraulic pressure chamber, an operator operated plunger member which is reciprocably mounted in the pressure-transmitting member and which controls operation of the power cylinder by means of its movements with respect to the pressure-transmitting member, the end of the plunger member adjacent the hydraulic pressure chamber being subjected to the pressure in said chamber, the pressure-transmitting member and the plunger member having a combined effective liquid-displacing area in the pressure chamber equal to the area of the opening in the closure member, a hydraulic reservoir having a port which opens into the hydraulic pressure chamber, and a valve element which is arranged when seated to prevent flow of liquid from the hydraulic pressure chamber to the reservoir and which is held open by the pressure-transmitting member when the latter is in retracted position.

10. A liquid pressure-producing device, in which physical force is supplemented by power assistance, comprising a power cylinder, a hydraulic cylinder located at one end of the power cylinder and having a pressure chamber, a closure member between said pressure chamber and the interior of the power cylinder and having an opening therethrough, a pressure-responsive movable wall in the power cylinder, a tubular pressure-transmitting member connected to the movable wall and extending through the opening in the closure member into the hydraulic pressure chamber, an annular sealing member seating against said closure member and engaging the outer surface of said pressure-transmitting member to prevent escape of liquid from the hydraulic pressure chamber, an operator operated plunger member which is reciprocably mounted in the pressure-transmitting member and which controls operation of the power cylinder by means of its movements with respect to the pressure-transmitting member, the end of the plunger member adjacent the hydraulic pressure chamber being subjected to the pressure in said chamber, the pressure transmitting member and the plunger member having a combined effective liquid-displacing area in the pressure chamber smaller than the cross-sectional area of said pressure chamber, and a sealing member which prevents escape of liquid from the hydraulic pressure chamber through the pressure-transmitting member.

11. A liquid pressure-producing device, in which physical force is supplemented by power assistance, comprising a power cylinder, a hydraulic cylinder located at one end of the power cylinder and having a pressure chamber, a pressure-responsive movable wall in the power cylinder, a hollow pressure-transmitting member connected to the movable wall and extending into the hydraulic pressure chamber, a plunger member which is reciprocably mounted in the pressure-transmitting member and which controls operation of the power cylinder by means of its movements with respect to the pressure-transmitting member, the end of the plunger member adjacent the hydraulic pressure chamber being subjected to the pressure in said chamber, and a movement-opposing member mounted between axially-spaced surfaces provided by the movable wall and by the plunger member, said movement-opposing member being axially spaced in released position from at least one of said surfaces and being axially yieldable under pressure, said movement-opposing member acting to increase the force opposing further movement of the plunger member with respect to the pressure-transmitting member after a predetermined amount of movement of the plunger member on the applying stroke.

12. A liquid pressure-producing device, in which physical force is supplemented by power assistance, comprising a differential air pressure power cylinder, a hydraulic cylinder located at one end of the power cylinder and having a pressure chamber, a pressure-responsive movable wall in the power cylinder having a central opening, a tubular pressure-transmitting member secured at one end to the movable wall in alignment with said opening and extending at the other end into the hydraulic pressure chamber, said tubular member having a port adapted to provide communication between the interior of the tubular member and the power cylinder chamber formed between the movable wall and the end of the power cylinder adjacent the hydraulic cylinder, a cylindrical valve member slidably mounted inside the tubular member, the exterior of the valve member having two reduced-diameter portions providing chambers which are separated by an annular land and which are in communication, respectively, with the atmosphere and with a vacuum source, the atmosphere-connected valve chamber being in communication with the port in the tubular member in released position, and a plunger member located inside the tubular member and operatively connected to the valve member, one end of the plunger member being subjected to the pressure in the hydraulic pressure chamber.

13. A liquid pressure-producing device, in which physical force is supplemented by power assistance, comprising a differential air pressure power cylinder, a hydraulic cylinder mounted on one end of the power cylinder and having a pressure chamber which is provided with a discharge port, a pressure-responsive movable wall in the power cylinder having a central opening, said movable wall dividing the power cylinder into a constant pressure chamber and a control chamber, a tubular pressure-transmitting member secured at one end to the movable wall in alignment with said opening and extending at the other end into the hydraulic pressure chamber, said tubular member having a port which is adapted to provide communication between the interior of the tubular member and the control chamber of the power cylinder, a slide valve movable inside the tubular member and arranged to selectively connect the port in the tubular member to the atmosphere or to a vacuum source, the interior of the valve being in constant communication with the atmosphere, a portion of the exterior of the valve being in constant communication with vacuum, an operator operated rod connected to the end of the valve, a plunger member located inside the tubular member and arranged to move in conformity with the valve, one end of the plunger member extending into the hydraulic pressure chamber, an annular head on the end of the tubular member inside the hydraulic pressure chamber, said head having an outer portion of greater diameter than the effective liquid-displacing diameter of the tubular member and an inner portion which engages the outer surface of the plunger member, and a flexible diaphragm which is peripherally secured to the outer portion of the head and which covers the end of the plunger member to act as a seal between the hydraulic pressure chamber and the interior of the tubular member.

14. A liquid pressure-producing device, in which physical force is supplemented by power assistance, comprising a differential air pressure power cylinder, a hydraulic cylinder mounted on one end of the power cylinder and having a pressure chamber provided with a discharge port, a pressure-responsive movable wall in the power cylinder having a central opening, a tubular pressure-transmitting member secured at one end to the movable wall in alignment with said opening and extending at the other end into the hydraulic pressure chamber, said tubular member having a port adapted to provide communication between the interior of the tubular member and the power cylinder chamber formed between the movable wall and the end of the power cylinder adjacent the hydraulic cylinder, a slide valve movable inside the tubular pressure-transmitting member and arranged to selectively connect the port in the latter member to the atmosphere or to a vacuum source, an operator operated rod connected to the end of the valve, the power cylinder chamber through which the rod and valve extend and the interior of the valve being open to the atmosphere, a plunger member located inside the tubular pressure-transmitting member and arranged to move with the valve, one end of the plunger member extending into the hydraulic pressure chamber, an annular head on the end of the tubular pressure-transmitting member inside the hydraulic pressure chamber, said head having an outer portion of greater diameter than the effective liquid-displacing diameter of the tubular pressure-transmitting member and an inner portion which engages the outer surface of the plunger member, and a flexible diaphragm which is peripherally secured to the outer portion of the head and which covers the end of the plunger member to act as a seal between the hydraulic pressure chamber and the interior of the tubular pressure-transmitting member, said valve being interposed between and in contact with said operator operated rod and said plunger member whereby force may be transmitted from either said rod or said plunger through said valve to the other.

15. In a liquid pressure-producing device, an action-and-reaction-force means comprising a differential air pressure power cylinder having a pressure-responsive movable wall therein, a hydraulic cylinder mounted on one part of said power cylinder, a tubular pressure-transmitting member secured to said wall and projecting into said hydraulic cylinder, valve control and reaction pressure means movable inside said tubular member and comprising a tubular valve having its opposite ends positioned on opposite sides of said wall and a plunger which extends from physical contact with one end of said tubular valve into said hydraulic cylinder, a flexible fluid impervious diaphragm fitted over the hydraulic cylinder ends of said tubular pressure-transmitting member and said plunger, a manually operable rod engaged with the other end of said tubular valve and operable to receive reaction thrust from said plunger through the intermediary of said valve, said valve having its interior in constant communication with the atmosphere, a first port in said tubular pressure-transmitting member, a second port in said valve communicable with said first port, two spaced port-severing lands provided on the outer periphery of said valve, one of said lands being operable to control communication between said first and second ports, an annular chamber formed between said lands and said tubular pressure-transmitting member and said valve, and a third port in said tubular pressure-transmitting member in constant communication with said annular chamber and adapted to be connected to a source of vacuum, said annular chamber being selectively connected with said first port when the latter is disconnected from said second port.

16. In a liquid pressure-producing device, an action and reaction force means comprising a differential air pressure power cylinder having a pressure-responsive movable wall therein, a hydraulic cylinder located at one end of the power cylinder and having a pressure chamber therein, a closure member between said pressure chamber and the interior of the power cylinder and having an opening therethrough, a tubular-pressure transmitting member connected to the movable wall and extending through the opening in the closure member into the hydraulic pressure chamber, sealing means coacting with said closure member to prevent escape of liquid from said latter chamber, valve control and reaction pressure means including a valve member reciprocably mounted centrally of said movable wall, manual means for actuating said valve member to produce a power stroke of said movable wall, a plunger reciprocably mounted in the pressure transmitting member in substantial alignment with the valve member for transmitting the reaction force to said manual means through the valve member, the end of the plunger remote from the valve member being subjected to the pressure in the hydraulic pressure chamber, the pressure-transmitting member and the plunger member having a combined effective liquid-displacing area in the pressure chamber equal to the area of the opening in the closure member, and sealing means for preventing the escape of liquid from the latter chamber through the tubular pressure transmitting member.

17. A liquid pressure producing device in which physical force is supplemented by power assistance, comprising a differential air pressure power cylinder, a hydraulic cylinder located at one end of the power cylinder and having a pressure chamber, a pressure responsive movable wall in the power cylinder having a central opening, a tubular pressure-transmitting member extending at one end into the hydraulic pressure chamber and having its opposite end secured to the movable wall in alignment with said opening, the latter end of said tubular member being provided with a valve extension having a port adapted to provide communication between the interior of the said extension and the power cylinder chamber formed between the movable wall and the end of the power cylinder adjacent the hydraulic cylinder, a cylindrical valve member slidably mounted inside the valve extension of the tubular member, the exterior of the valve member having reduced-diameter portions providing valve lands which define a pair of chambers in communication respectively with the atmosphere and with a vacuum source, the atmosphere-connected valve chamber being in communication with the port in the valve extension when the movable wall is in released position, a plunger member located inside the tubular pressure-transmitting member and adapted to transmit reaction pressure from the hydraulic pressure chamber to said valve member, the end of the plunger member adjacent the hydraulic chamber being subjected to the pressure in said latter chamber, and sealing means for preventing the escape of liquid from the hydraulic pressure chamber between said plunger and said pressure transmitting member.

18. A hydraulic pressure producing device comprising a differential air pressure power cylinder, a hydraulic cylinder mounted on one end of the power cylinder and having a pressure chamber which is provided with a discharge port, a closure member between said pressure chamber and the interior of the power cylinder and provided with an opening therethrough, a pressure-responsive movable wall in the power cylinder, a force-transmitting member, one end of which engages the movable wall and the other end of which extends through the opening in the closure member into the hydraulic pressure chamber, the relative effective diameters of said hydraulic pressure chamber and that portion of the force-transmitting member which extends therein being such as to provide substantial clearance therebetween, an annular sealing member seated against said closure member and engaging the outer surface of the force-transmitting member to prevent escape of liquid from the hydraulic pressure chamber, a hydraulic reservoir mounted above the hydraulic cylinder and having a port which opens into the hydraulic pressure chamber, a valve element which is located adjacent to the closure member and which is arranged when seated to prevent flow of liquid from the hydraulic pressure chamber to the reservoir, a spring which tends to seat the valve element, a valve stem associated with the valve element which extends into the hydraulic pressure chamber, and a valve-unseating projection on the force-transmitting member inside the hydraulic pressure chamber which engages the valve stem during the final portion of the retractile stroke to lift one side of the valve element and thereby permit communication between the hydraulic pressure chamber and the reservoir.

19. A hydraulic pressure device comprising a power cylinder, a hydraulic cylinder mounted on one end of the power cylinder and having a pressure chamber which is provided with a discharge port, a closure member between said pressure chamber and the interior of the power cylinder and provided with an opening therethrough, a pressure-responsive movable wall in the power cylinder, a force-transmitting member, one end of which engages the movable wall and the other end of which extends through the opening in the closure member into the hydraulic pressure chamber, the relative effective diameters of said hydraulic pressure chamber and that portion of the force-transmitting member which extends therein being such as to provide substantial clearance therebetween, a hydraulic reservoir associated with the hydraulic cylinder and having a port which opens into the hydraulic pressure chamber, a valve element which is located adjacent to the closure member and which is arranged when seated to prevent flow of liquid from the hydraulic pressure chamber to the reservoir, a spring which tends to seat the valve element, a valve stem associated with the valve element which extends into the hydraulic pressure chamber, and a valve-unseating projection on the force-transmitting member inside the hydraulic pressure chamber which engages the valve stem during the final portion of the retractile stroke to lift one side of the valve element and thereby permit communication between the hydraulic pressure chamber and the reservoir.

References Cited in the file of this patent

UNITED STATES PATENTS

| Number | Name | Date |
|---|---|---|
| 1,781,869 | Bragg et al. | Nov. 18, 1930 |
| 2,006,487 | Sorensen | July 2, 1935 |
| 2,260,491 | Stelzer | Oct. 28, 1941 |
| 2,407,097 | Porter | Sept. 3, 1946 |
| 2,526,457 | Bradbury | Oct. 17, 1950 |
| 2,532,960 | Stelzer | Dec. 5, 1950 |
| 2,617,261 | Ringer | Nov. 11, 1952 |

FOREIGN PATENTS

| Number | Country | Date |
|---|---|---|
| 747,273 | France | Mar. 28, 1933 |